(12) United States Patent
Muller et al.

(10) Patent No.: US 11,974,197 B2
(45) Date of Patent: *Apr. 30, 2024

(54) METHOD AND SYSTEM FOR DISTRIBUTED MANAGEMENT OF REMOTE TRANSMITTERS INTERACTING WITH MOBILE DEVICES

(71) Applicant: Synchrony Bank, Stamford, CT (US)

(72) Inventors: Daniel Muller, Chicago, IL (US); Patrick Caraher, Munster, IN (US)

(73) Assignee: SYNCHRONY BANK, Stamford, CT (US)

(*) Notice: Subject to any disclaimer, the term of this patent is extended or adjusted under 35 U.S.C. 154(b) by 39 days.

This patent is subject to a terminal disclaimer.

(21) Appl. No.: 17/473,157

(22) Filed: Sep. 13, 2021

(65) Prior Publication Data

US 2022/0086605 A1 Mar. 17, 2022

Related U.S. Application Data

(63) Continuation of application No. 14/543,284, filed on Nov. 17, 2014, now Pat. No. 11,159,919.

(60) Provisional application No. 61/904,781, filed on Nov. 15, 2013.

(51) Int. Cl.
*H04W 4/12* (2009.01)
*G01S 1/02* (2010.01)
*G01S 1/68* (2006.01)
*H04W 4/80* (2018.01)

(52) U.S. Cl.
CPC ............... *H04W 4/12* (2013.01); *G01S 1/024* (2013.01); *G01S 1/68* (2013.01); *H04W 4/80* (2018.02)

(58) Field of Classification Search
CPC ....... H04W 4/12; H04W 16/18; H04W 4/008; H04W 40/244; H04W 4/005; H04W 88/085; H04W 4/80; G01S 1/024; G01S 1/68

See application file for complete search history.

(56) References Cited

U.S. PATENT DOCUMENTS

| | | |
|---|---|---|
| 7,146,293 B2 | 12/2006 | Badovinac et al. |
| 8,064,412 B2 | 11/2011 | Petite |
| 8,756,030 B2 | 6/2014 | Davis et al. |
| 9,255,807 B2 | 2/2016 | Lee et al. |
| 9,396,487 B1* | 7/2016 | Kerr ..................... H04W 4/021 |
| 9,438,700 B2 | 9/2016 | Bonefas et al. |
| 2006/0111103 A1 | 5/2006 | Jeong et al. |
| 2012/0020339 A1 | 1/2012 | Lai |
| 2012/0200460 A1 | 8/2012 | Weed et al. |
| 2013/0059542 A1 | 3/2013 | Shimizu |
| 2013/0210461 A1 | 8/2013 | Moldavsky et al. |
| 2013/0282438 A1* | 10/2013 | Hunter ............... G06Q 30/0201 705/7.32 |

(Continued)

OTHER PUBLICATIONS

Office Action dated Nov. 25, 2015 in U.S. Appl. No. 14/543,284.

(Continued)

*Primary Examiner* — Ankur Jain
(74) *Attorney, Agent, or Firm* — Polsinelli LLP

(57) ABSTRACT

A method and system for distributed management and maintenance of remote transmitters, or beacons, via a remotely hosted integrated software platform and the interaction of the beacons with mobile devices in an environment where the beacons are located.

24 Claims, 5 Drawing Sheets

(56) References Cited

U.S. PATENT DOCUMENTS

2014/0099889 A1    4/2014   Seo et al.
2014/0235265 A1    8/2014   Slupik
2015/0016281 A1    1/2015   Jagetiya et al.
2015/0104152 A1    4/2015   Reinhardt et al.

OTHER PUBLICATIONS

Office Action dated Aug. 4, 2016 in U.S. Appl. No. 14/543,284.
Office Action dated Apr. 7, 2017 in U.S. Appl. No. 14/543,284.
Office Action dated Nov. 15, 2017 in U.S. Appl. No. 14/543,284.
Office Action dated Dec. 18, 2018 in U.S. Appl. No. 14/543,284.
Office Action dated Feb. 21, 2020 in U.S. Appl. No. 14/543,284.
Office Action dated Feb. 1, 2021 in U.S. Appl. No. 14/543,284.
Notice of Allowance dated Jun. 28, 2021 in U.S. Appl. No. 14/543,284.

* cited by examiner

METHOD AND SYSTEM FOR DISTRIBUTED MANAGEMENT OF REMOTE TRANSMITTERS INTERACTING WITH MOBILE DEVICES

CROSS-REFERENCE TO RELATED APPLICATION

The present application is a continuation of U.S. patent application Ser. No. 14/543,284 filed Nov. 17, 2014, which claims priority to U.S. Provisional Patent Application No. 61/904,781 filed Nov. 15, 2013, which are incorporated herein by reference in their entireties.

FIELD OF THE INVENTION

The present invention relates broadly to the management of transmitters interacting with mobile devices and more particularly to a method and system for distributed management and maintenance of interactions between remote transmitters and mobile devices.

BACKGROUND OF THE INVENTION

In general, location-based systems that include remote transmitters, such as beacons, are known. A beacon is a short-range wireless transmitter designed to broadcast a unique identifier from a physical location. Beacon technology can be implemented using, for example, WiFi, NFC, micro-cellular, or Bluetooth/Bluetooth low energy (BLE). In use, a beacon broadcasts or radiates a signal to a mobile device to provide proximately based information. For example, a mobile device may interact with a nearby beacon by detecting a strong WiFi signal in the form of SSID, which could then be used to determine a precise location of the beacon and/or mobile device by looking up the SSID in a table or database. However, continuously assessing the location of beacons using tables and/or a database and managing beacons in general is extremely laborious and time consuming and can create a lag in providing data to a consumer and/or a retailer. Moreover, current systems do not have the capabilities to assess the status of the beacons that are part of the system. As such, current systems do not provide real time updates or allow for quick and easy updates and repairs and/or replacement of beacons, when necessary.

SUMMARY OF THE INVENTION

In an embodiment, the present invention is directed to a system and a method that allows for distribution, management, and maintenance of a system platform incorporating remote transmitters, or beacons, and the interaction of beacons with mobile devices. The system platform is part of an integrated, remotely hosted software system. The capabilities of the system platform range from setup, registration, and initiation of beacons at physical locations to the integration of beacons with the software system to allow for management of the beacons associated with a physical location or multiple locations. Once the placement, setup, registration, and initiation is complete, the software system can then manage communication between the beacon and mobile devices, typically, but not limited to smart phones. Other examples of mobile devices can include tablets, cellular phones, pagers, and/or specialized hardware designed to interact with a wireless connection to support a mobility application.

The communication between beacons and mobile devices is managed by the software platform through a content management system. This communication allows a mobile device to display specific content, such as store offers or videos, which are associated to a specific beacon and allows for an alert to be sent should an issue arise with a beacon. Additionally, a tracking system can archive interactions between beacons and mobile devices for statistical reporting, analysis, and future use.

In an embodiment, the present invention is directed to a system for providing remote management of a venue that can include a plurality of sections. The system comprises a plurality of beacons that each have a unique identifier and are physically disposed in one of the sections. Each of the beacons is configured to generate a short range wireless message in response to a query that includes a respective unique identifier and an information segment indicative of a current condition of the respective beacon. A central server is configured to receive device messages from devices in the venue. Each device is configured to generate a query in a respective section and to receive a respective beacon message from the beacon disposed in the respective section. The device message includes all information from the beacon message with the central server configured to analyze the device messages and generate a report about the status of at least some of the beacons based on the device messages.

DETAILED DESCRIPTION OF EMBODIMENTS OF THE PRESENT INVENTION

With reference now to the drawings, by way of example, FIGS. 1 through 5 illustrate embodiments of a system platform for location-based distribution, management and maintenance of interactions between remote transmitters and mobile devices. In an embodiment, the system platform can be leveraged by retailers for marketing, engagement, tracking, and remote transmitter health management and integrated into their existing applications.

The system incorporates multiple individuals as will be discussed in more detail below. These individuals include IT maintenance personnel that aid in operating and maintaining systems, associates affiliated with a retailer that are responsible for monitoring internally aspects of the system, and customers, potential customers, or end users.

Figure 1:
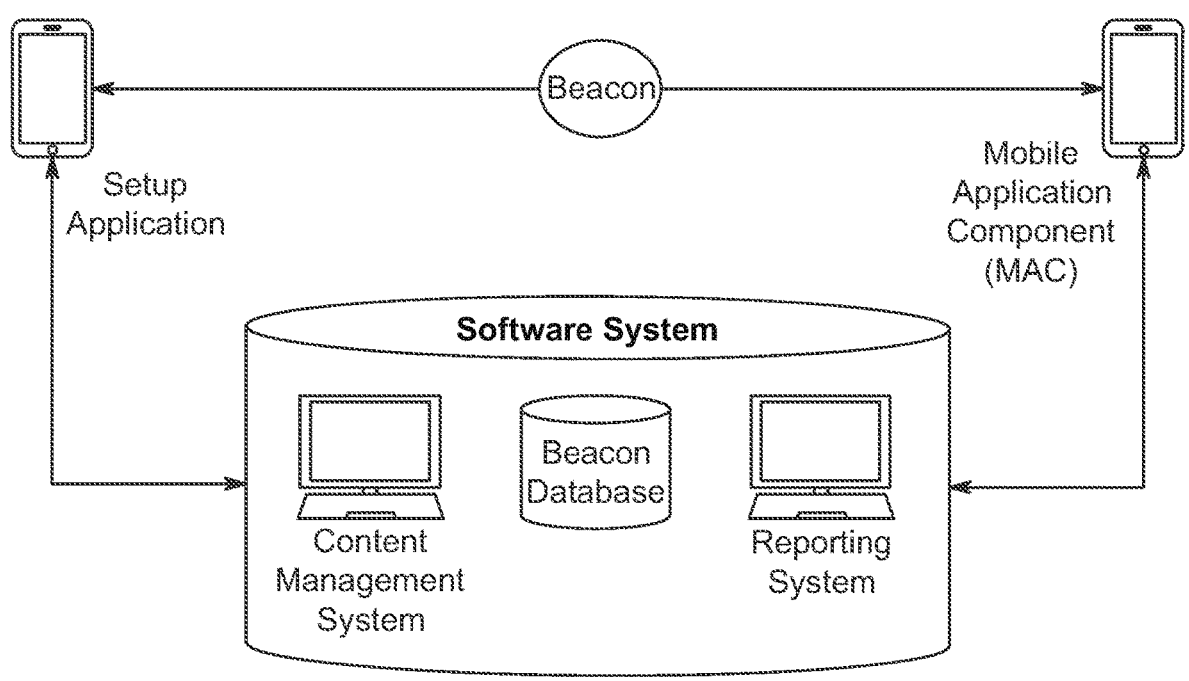
FIG. 1 shows a flow chart of an embodiment of the present invention for registration of a beacon to a physical location.

FIG. 1 illustrates an overall system for location-based distribution, management, and maintenance of interactions between remote transmitters (e.g., beacons) and mobile devices via a remotely hosted software application. This software system provides for content management and distribution, beacon management, and reporting tools, among other features as will be described below.

Beacons are hardware devices that each emits a unique identifier via a Bluetooth Low Energy (BLE) signal or other similar preferably short-range wireless command protocol. In an embodiment, the beacons are made by KSTechnologies.

Figure 2:
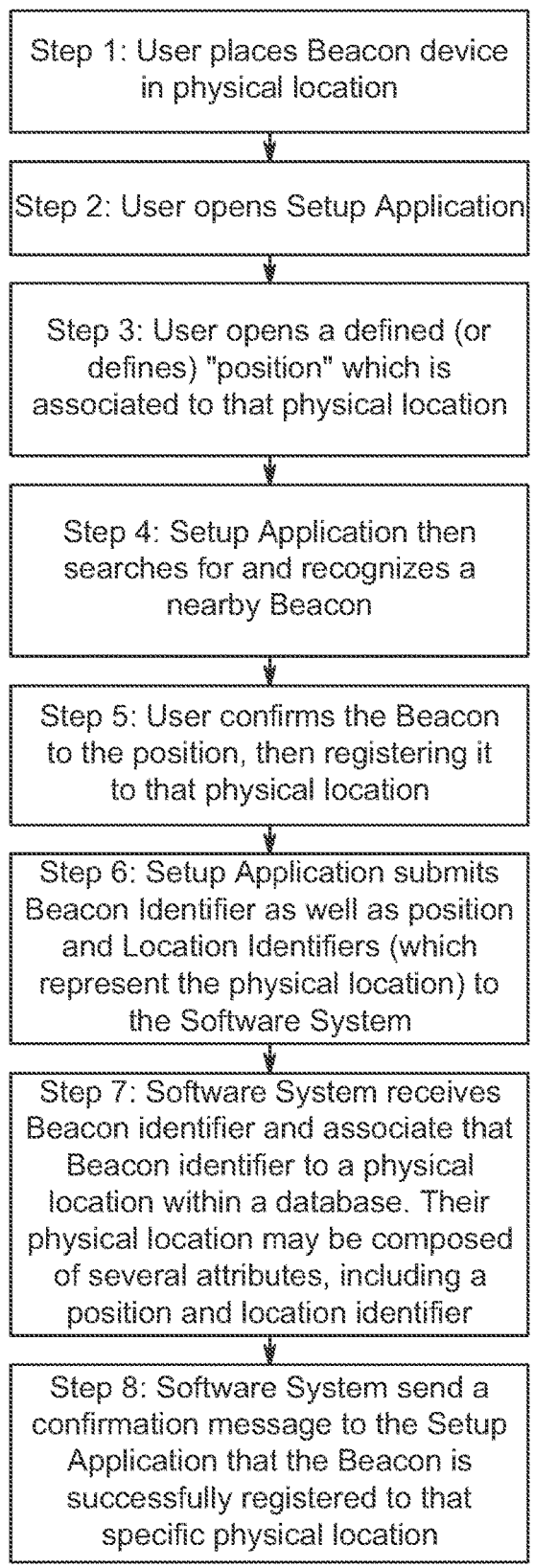
FIG. 2 shows a flow chart of an embodiment of the present invention of the interaction between a mobile device and a beacon.
Figure 2:
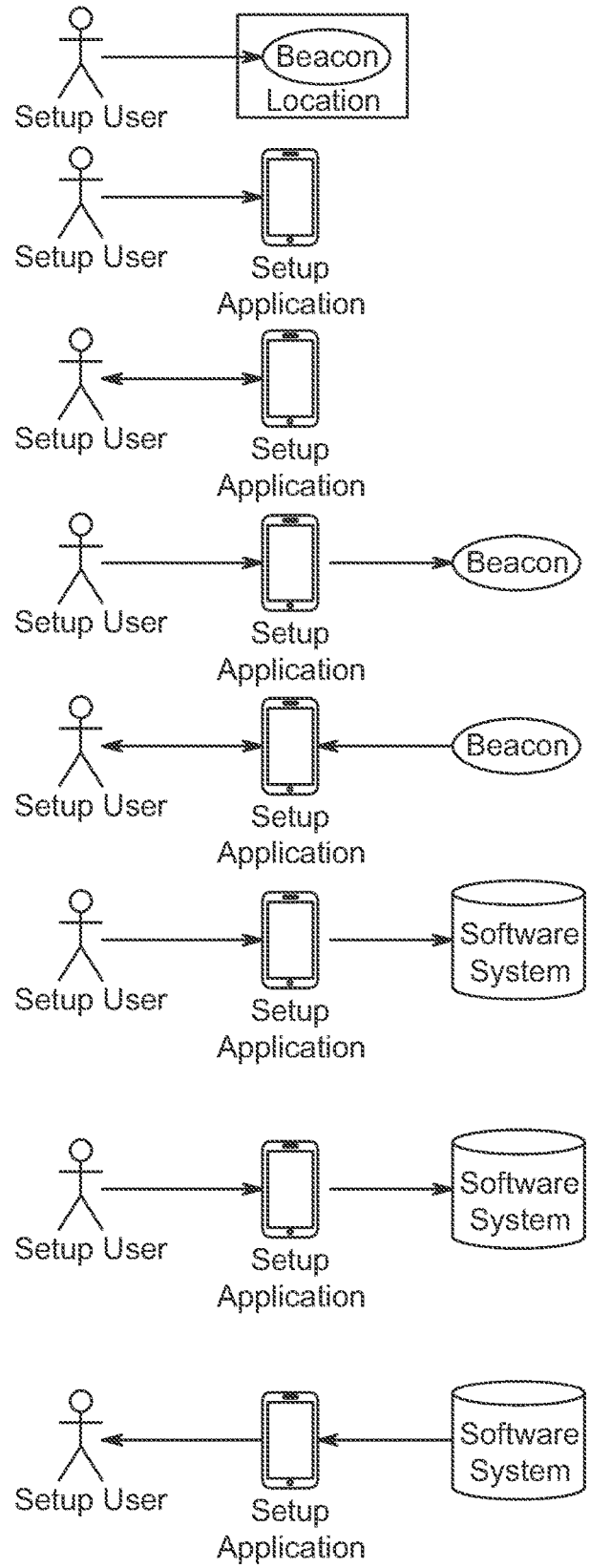

As shown in an embodiment in FIG. 2, as part of the system, a beacon is registered to a physical location. To register a beacon (Step 1), a beacon is first placed at a specific location (e.g. in a store near a display). Next, at Step 2, a mobile application called a "setup application" is opened. In the setup application, a defined position associated with the specific location (e.g., a specific aisle at a store or a particular section at a stadium) (Step 3) is opened. Then, as shown at Step 4, the setup application searches for and recognizes a nearby beacon. The beacon's position is confirmed (Step 5), which in turn registers the beacon to the physical location. The setup application then at Step 6 submits an identifier, which represent the position and location of the beacon to a software system. The software system in turn receives the beacon's identifier and associates the beacon's identifier to a physical location within a database allowing the software system the ability to identify a beacon's location. In an embodiment, the physical location may be determined based on attributes including position and location identifiers. The software system then, at Step 8, sends a confirmation message to the setup application that the beacon has been successfully registered to the specific physical location. In this manner, an automated inventory is performed when every active beacon positioned is identified and cataloged.

In an embodiment, the software system includes content management allowing an IT maintenance team member to manage the content transmitted to beacons. The software system also includes a reporting system where statistical information of beacons in a system is displayed and can establish flow-through analysis of end users moving around a physical location where beacons are positioned. The software system also includes a beacon database or repository that stores all data associated with the beacons in a system, including, but not limited to their physical location, in location positions, geographical positions, planning zones, end user interactions and any other meta-data associated with beacons in a system.

By assigning each beacon to a position for a given physical location, the system can manage a large number of beacons (e.g., millions of beacons) within a single software system hosted in a server farm. Existing software systems couple a specific beacon with a specific action. For example, an application will be configured to listen for a specific beacon and take a specific action. The claimed invention configures both the beacons to which the application listens and the actions to be taken when encountering these beacons. Using a console management system (CMS), a retailer can implement a campaign for a specific beacon location. For example, a retailer can configure every beacon located at an entrance of a retail store to broadcasts a welcome message and/or offer a discount. The setup application can communicate this information to the CMS or cloud server, which reads the information provided and adjusts the beacons accordingly.

CMS is a system that remotely manages the beacons and includes a dashboard to allow for viewing of marketing campaigns, position of beacons, campaign content and remote health management (e.g., battery life of the beacons).

In an embodiment, the system can be configured to provide distributed marketing management. That is, the system can categorize beacons that are part of the system around pre-established physical locations, or positions (e.g. store entrance, fitting room, shoe department). This allows for the management of messaging and marketing at the positions without requiring the time consuming management of each individual beacon. For example, all "entrance position" beacons of a retail store may provide a 5% coupon, while beacons placed in fitting rooms may provide access to 100 extra loyalty points to any customer that has a mobile application component (discussed in more detail below) affiliated with that retail store installed on their mobile device. By classifying beacons, a retailer can easily manage their marketing across all stores or any grouping of stores, if desired.

In an embodiment, in addition to registering a beacon to a physical location, the setup application can also unregister a beacon from a physical location (i.e., remove the association of the physical location and the beacon). This can be accomplished by communication between the setup application and the CMS to read the registered locations of the beacons. A retail associate can either confirm that beacons exist at the expected positions, remove the association of a beacon at a position, or assign a new beacon to a position.

Figure 3:
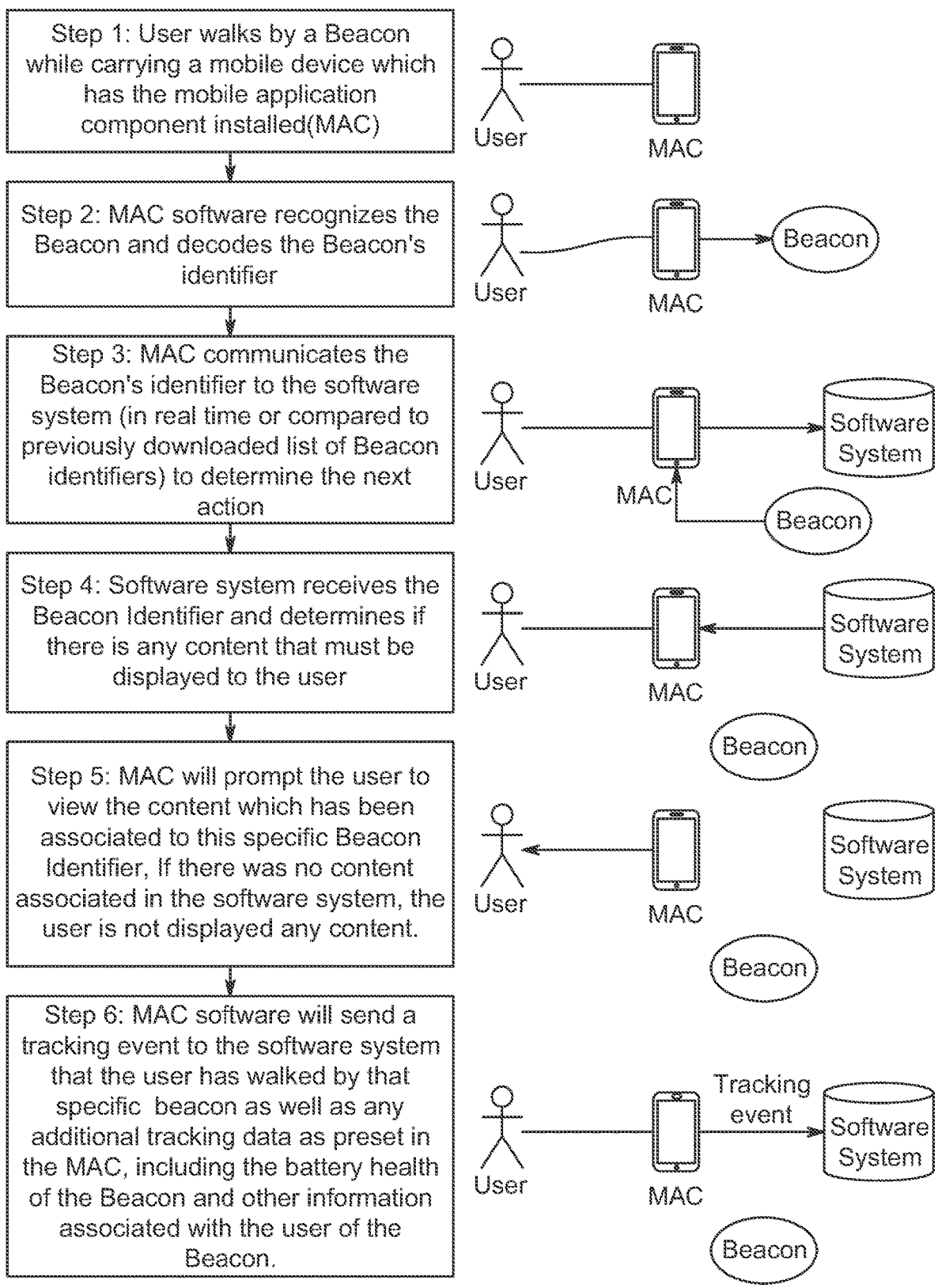
FIG. 3 shows a flow chart of an embodiment of a management system of the present invention.

FIG. 3 shows an embodiment of a flow chart outline how a mobile device can be used to interact with beacons after the position of beacons associated with a system are established. In order for a mobile device to be able to interact with beacons in a system, a "mobile application component" that is integrated with the system, must be installed on a mobile device. The mobile application component can be a free standing application or a component within another application. The mobile application component acts as a conduit between the software system and the beacon's identifying signal. Once a mobile application component is installed on 2 mobile device, as shown at Steps 1 and 2 of FIG. 3, if a potential consumer is in the vicinity of a beacon while carrying the mobile device, the software associated with mobile application component recognizes the beacon and decodes the beacon's identifier. The mobile application component then at Step 3 communicates the beacon's identifier in real time to the software system determine the next action or the beacon's identifier is communicated to the software system where it is compared to a previously downloaded list of beacon identifiers. As shown in FIG. 2, at Step 4, the beacon identifier that has been communicated to the software system is then received by the software system to determine what, if any, content (e.g., promotion, web page, mobile application page, video, etc.) must be displayed to the potential consumer. If there is content to be displayed, at Step 5, the mobile application component will prompt the potential consumer to view the content associated with the specific beacon identifier that is displayed on their mobile device. In an embodiment, the content is personalized to each user of the system. This is done, for example, by reviewing the customer's previous purchases, in-store browsing patterns, and provided personal information among other data collected about the customer. If there is no content associated with beacon in the software system, no content will be displayed on the customer's mobile device. Finally, at Step 6, the mobile application component installed on the customer's mobile device will then send a tracking event to the software system that a customer walked past a specific beacon. The tracking event can be used to generate a profile of the customer for future use. For example, if a customer walked past a section selling children's clothing, the system can augment the customer's profile and may next visit or later in the same visit send an alert about a discount on children's clothing.

The system can further transparently send packaged data to both IT personnel and customers simultaneously In an embodiment, in addition to alerting the software system that the customer walked past a specific beacon, additional tracking data preset in the mobile application component, including the health of the beacon's battery, the temperature of the beacon or the pressure associated with the beacon, can be sent within the same identifying signal to the software system for continued monitoring of the beacon. The same signal can be used to send an alert or message to a customer and meta-data to the system through the pre-allocation of bits containing the meta-data. By providing information to the software system about a particular beacon, the software system, should alert a sales associate, for example, the battery life of the beacon be low, so that an adjustment can be made to the beacon or a replacement beacon can be installed to ensure continued efficiency of the overall system. Thus, the system allows for two-way communication and continued maintenance.

Moreover, in an embodiment, if a customer in a retail location has a question or needs assistance, the customer can "call for help" using the retailer's mobile application. When the customer requests assistance, a nearby beacon will alert a sales associate of the customer's request and provide proximately and the in-store location of the customer to the store associate who can then provide timely assistance.

Figure 4:
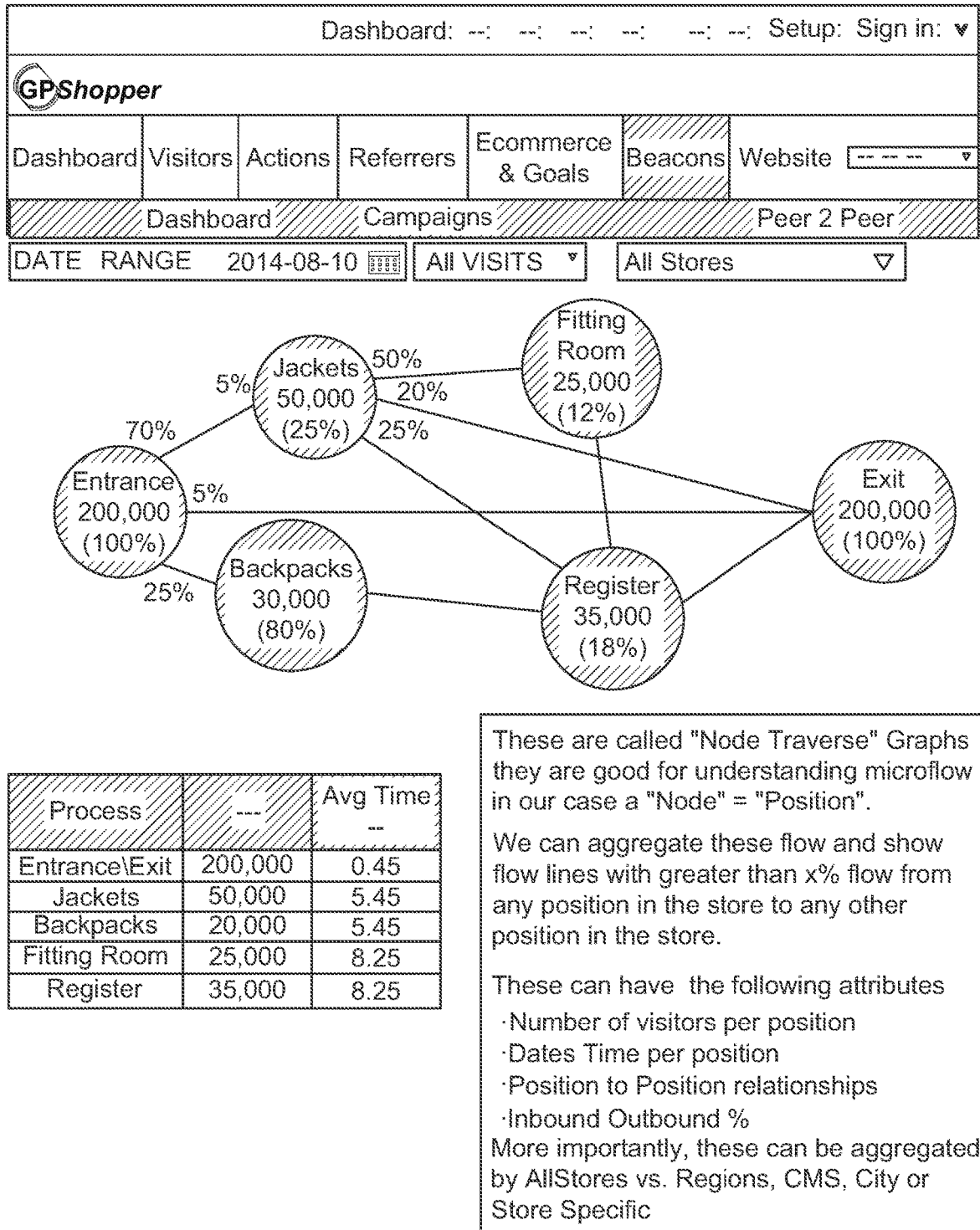
FIG. 4 is an image showing position flow tracking at a retail location.

In an embodiment, as shown in FIG. 4, the system provides for position flow tracking (e.g., Node Traverse data modelling) of traffic patterns that shows how customers move through an environment, such as a retail store, from one position in the environment to another position in the environment. Position flow tracking allows for the aggregation, for example, of heat-mapped or flow-mapped individual movements throughout multiple store locations (e.g., 1000 retail locations), not just a single store. Position flow tracking aids a corporation in gaining a further understanding regional trends in how in-store marketing is driving flow and popular paths consumers take through a specific store, among other observations to see if any specific stores have outlier performance so as to then adjust and better optimize the layout of each store. The system thus allows for mobile in-store marketing, tracking and interaction. By tracking in-store interactions, the corporation can further optimize commerce to gather and report interactions between mobile devices and beacons. For example, in an embodiment, the temperature of a store can be adjusted, if needed, depending on the conditions reported by the volume of traffic patterns in a retail environment.

Figure 5:
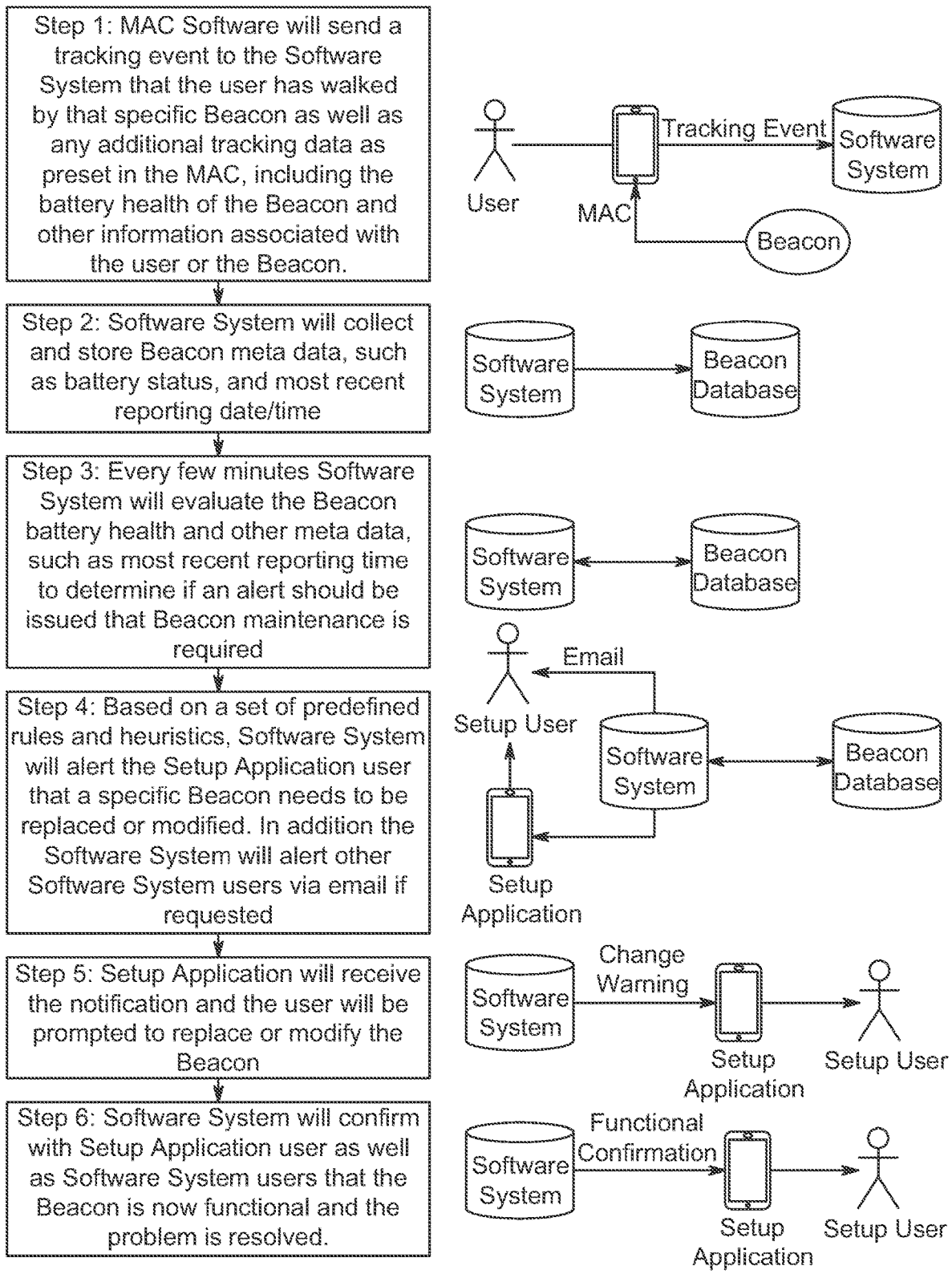
FIG. 5 shows an embodiment of the overall integrated system of the present invention.

In an embodiment, FIG. 5 depicts a flowchart of distributed management of meta-data of beacons associated with a particular environment (e.g., retail location(s) of a corporation). As shown, at Step 1 the mobile application component associated with an individual's mobile device can send a tracking event to the software management system, alerting the software management system that the individual has walked past a specific beacon associated with the system as well as any additional tracking meta-data preset in the mobile application component (e.g., battery health of the beacon and other meta-data). The software system will then at Step 2 collect and store beacon meta-data, including the battery status of the beacon and most recent reporting date/time. Every few minutes, the software system will then evaluate the beacon meta-data, including the battery health and most recent reporting time of the beacon to determine if an alert should be issued that maintenance of beacon is required (Step 3). As indicated at Step 4, based on a set of predefined rules and heuristics, the software system will send an alert that a specific beacon needs to be replaced, repaired or modified. In addition, the software system will alert other users of the software system of the health of the beacon via email, if requested. If an issue should arise with a beacon, once the beacon has been replaced or repaired, the software system will confirm with the setup application and users of the software system that the beacon is functional and any problem associated with the beacon has been resolved.

Distributed management thus allows the system as a whole to self-identify issues with particular beacons and provide information to be able to identify the beacon at issue to repair or replace the beacon. For example, for a corporation, if there is an issue with a particular beacon at one retail location, the system can provide an alert to a corporate management console that can identify the specific retail store and beacon that is not performing as desired and then in turn, if needed, send an alert to a sales associate at the store where the beacon is not performing as desired to alert the associate to repair or replace the beacon.

In an embodiment, the system allows for secure peer-to-peer communication that creates an "ad-hoc" connection between a customer or potential customer's mobile device (application configured with the software on the mobile device) and a retail associate. That is, mobile devices that include the system's mobile application component (software development kit (SDK)) can communicate via Bluetooth low energy with each other once they are in range of each other.

In an embodiment, the in-store sales associate can have a device (e.g., an iPad) that acts as a unique beacon. When the customer's mobile device that includes the mobile application component encounters this beacon, the customer's device becomes a temporary, ad-hoc, beacon. This ad hoc beacon contains a temporary, unique identification that identifies the customer and their location within the store. The in-store retail associate's mobile device then receives the signal from the customer's ad-hoc beacon and sends this temporary identification to a cloud server or CMS, which then responds with specific information about the customer (e.g., name, purchasing history, etc.) displayed on the retail associate's device.

In an embodiment, the communication using the system's mobile application component two mobile devices are consistent of just encrypted temporary identifiers that are decrypted by each device sending separate and secure communication. This reduces the probability that any secure information can be intercepted via Bluetooth. In an embodiment, the mobile application component includes a "call for help" feature where an individual can initiate a request for assistance. The mobile device will emit a Bluetooth signal that consists of a temporary identifier. Once the retail associate's mobile device receives the temporary identifier, it will decrypt the identifier by calling the system's platform. The platform will send the desired information requested to assist the consumer. This information may include the shopper's in-store location based on the proximately to a beacon, the shopper's name, the shopper's photo, and any other information about the shopper that has been provided and available from the system platform.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure.

What is claimed:

1. A computer-implemented method comprising:
   storing in a management system a plurality of positions associated with a plurality of beacons, wherein the plurality of positions pertain to campaign meta-data corresponding to the plurality of beacons, and wherein a beacon is assigned to a pre-established physical location and has a corresponding unique identifier;
   receiving a real-time communication, wherein when the communication is received from a mobile application associated with a user device, the communication includes a unique identifier corresponding to an interaction with one of the plurality of beacons;
   determining a matching beacon, wherein determining includes matching the unique identifier in the real-time communication to one of the plurality of beacons;
   determining the pre-established physical location assigned to the matching beacon, wherein the pre-established physical location is associated with the real-time communication;
   determining campaign content associated with the matching beacon according to the pre-established physical location assigned to the matching beacon, wherein the campaign content is a subset of the campaign meta-data;
   transmitting the campaign content, wherein when the campaign content is received on the mobile application associated with the user device the campaign content is displayable;
   updating the management system according to the campaign content;
   generating a tracking event corresponding to a profile of the mobile application, wherein the tracking event is associated with the determined pre-established physical location and the interaction; and
   aggregating data regarding the tracking event into a data model of traffic patterns corresponding to a plurality of mobile application users, wherein the data model associates the traffic patterns with one or more interactions.

2. The method of claim 1, further comprising:
   determining that one or more subsequent communications associated with the mobile application are sent from one or more subsequent physical locations; and
   identifying a path of the mobile application from a first physical location to a second physical location, wherein the second physical location is subsequent to the first physical location.

3. The method of claim 2, further comprising:
   identifying one or more patterns associated with a user of the mobile application.

4. The method of claim 1, further comprising:
   personalizing the interaction based on historical data associated with a profile of the mobile application.

5. The method of claim 4, wherein personalizing the interaction includes customizing a content display associated with the mobile application.

6. The method of claim 1, wherein the communication includes a device message corresponding to the interaction with one of the plurality of beacons, and wherein the device message includes data pertaining to an updated condition of the matching beacon.

7. The method of claim 1, further comprising:
   performing an action associated with the communication.

8. The method of claim 1, further comprising:
   maintaining a campaign dashboard associated with the management system, wherein the campaign dashboard allows management of messaging and marketing according to pre-established physical locations.

9. A system comprising:
   a management system that stores a plurality of positions associated with a plurality of beacons, wherein the plurality of positions pertain to campaign meta-data corresponding to the plurality of beacons, and wherein a beacon is assigned to a pre-established physical location and has a corresponding unique identifier;
   a communication interface that receives a real-time communication from a mobile application associated with a user device, the communication includes a unique identifier corresponding to an interaction with one of the plurality of beacons; and
   a processor that executes instructions stored in memory, wherein the processor executes the instructions to:
      determine a matching beacon, wherein determine includes to match the unique identifier in the real-time communication to one of the plurality of beacons;
      determine the pre-established physical location assigned to the matching beacon, wherein the pre-established physical location is associated with the real-time communication;
      determine campaign content associated with the matching beacon according to the pre-established physical location assigned to the matching beacon, wherein the campaign content is a subset of the campaign meta-data;
      transmit the campaign content, wherein when the campaign content is received on the mobile application associated with the user device the campaign content is displayable;
      update on the management system according to the campaign content;
      generate a tracking event corresponding to a profile of the mobile application, wherein the tracking event is associated with the determined pre-established physical location and the interaction; and
      aggregate data regarding the tracking event into a data model of traffic patterns corresponding to a plurality of mobile application users, wherein the data model associates the traffic patterns with one or more interactions.

10. The system of claim 9, wherein the processor executes further instructions to:
    determine that one or more subsequent communications associated with the mobile application are sent from one or more subsequent physical locations; and
    identify a path of the mobile application from a first physical location to a second physical location, wherein the second physical location is subsequent to the first physical location.

11. The system of claim 10, wherein the processor executes further instructions to:
    identify one or more patterns associated with a user of the mobile application.

12. The system of claim 9, wherein the processor executes further instructions to:
    personalize the interaction based on historical data associated with a profile of the mobile application.

13. The system of claim 12, wherein the processor personalizes the interaction by customizing a content display associated with the mobile application.

14. The system of claim 9, wherein the communication includes a device message corresponding to the interaction with one of the plurality of beacons, and wherein the device message includes data pertaining to an updated condition of the matching beacon.

15. The system of claim 9, wherein the processor executes further instructions to:
perform an action associated with the communication.

16. The system of claim 9, wherein the processor executes further instructions to:
maintain a campaign dashboard associated with the management system, wherein the campaign dashboard allows management of messaging and marketing according to pre-established physical locations.

17. A non-transitory, computer-readable storage medium having embodied thereon a program executable by a processor to perform a method comprising:
storing in a management system a plurality of positions associated with a plurality of beacons, wherein the plurality of positions pertain to campaign meta-data corresponding to the plurality of beacons, and wherein a beacon is assigned to a pre-established physical location and has a corresponding unique identifier;
receiving a real-time communication, wherein when the communication is received from a mobile application associated with a user device, the communication includes a unique identifier corresponding to an interaction with one of the plurality of beacons;
determining a matching beacon, wherein determining includes matching the unique identifier in the real-time communication to one of the plurality of beacons;
determining the pre-established physical location assigned to the matching beacon, wherein the pre-established physical location is associated with the real-time communication;
determining campaign content associated with the matching beacon according to the pre-established physical location assigned to the matching beacon, wherein the campaign content is a subset of the campaign meta-data;
transmitting the campaign content, wherein when the campaign content is received on the mobile application associated with the user device the campaign content is displayable;
updating the management system according to the campaign content;
generating a tracking event corresponding to a profile of the mobile application, wherein the tracking event is associated with the determined pre-established physical location and the interaction; and
aggregating data regarding the tracking event into a data model of traffic patterns corresponding to a plurality of mobile application users, wherein the data model associates the traffic patterns with one or more interactions.

18. The non-transitory, computer-readable storage medium of claim 17, further comprising instructions executable for:
determining that one or more subsequent communications associated with the mobile application are sent from one or more subsequent physical locations; and
identifying a path of the mobile application from a first physical location to a second physical location, wherein the second physical location is subsequent to the first physical location.

19. The non-transitory, computer-readable storage medium of claim 18, further comprising:
identifying one or more patterns associated with a user of the mobile application.

20. The non-transitory, computer-readable storage medium of claim 17, further comprising instructions executable for:
personalizing the interaction based on historical data associated with a profile of the mobile application.

21. The non-transitory, computer-readable storage medium of claim 20, wherein personalizing the interaction includes customizing a content display associated with the mobile application.

22. The non-transitory, computer-readable storage medium of claim 17, wherein the communication includes a device message corresponding to the interaction with one of the plurality of beacons, and wherein the device message includes data pertaining to an updated condition of the matching beacon.

23. The non-transitory, computer-readable storage medium of claim 17, further comprising instructions executable for:
performing an action associated with the communication.

24. The non-transitory, computer-readable storage medium of claim 17, further comprising instructions executable for:
maintaining a campaign dashboard associated with the management system, wherein the campaign dashboard allows management of messaging and marketing according to pre-established physical locations.

\* \* \* \* \*